(12) United States Patent
Wieland

(10) Patent No.: US 6,241,437 B1
(45) Date of Patent: Jun. 5, 2001

(54) HEXAPODAL MACHINING CENTER

(75) Inventor: Frank Wieland, Chemnitz (DE)

(73) Assignee: Fraunhofer-Gesellschaft zur Förderung der angewandten Forschung e.V., München (DE)

(\*) Notice: Subject to any disclaimer, the term of this patent is extended or adjusted under 35 U.S.C. 154(b) by 0 days.

(21) Appl. No.: 09/645,885

(22) Filed: Aug. 25, 2000

Related U.S. Application Data

(63) Continuation of application No. PCT/EP98/07593, filed on Apr. 27, 1999.

(30) Foreign Application Priority Data

Feb. 27, 1998 (DE) .......................................... 298 03 454 U

(51) Int. Cl.$^7$ .............................. B23C 1/12; B23B 39/00
(52) U.S. Cl. ...................... 409/201; 248/631; 408/234; 409/216; 409/235; 901/41
(58) Field of Search .................................... 409/235, 201, 409/216, 132, 145, 204, 211, 212; 408/234, 236; 248/631; 901/23, 41

(56) References Cited

U.S. PATENT DOCUMENTS

| | | | |
|---|---|---|---|
| 5,354,158 | 10/1994 | Sheldon et al. | 409/201 |
| 5,401,128 | 3/1995 | Lindem et al. | 409/132 |
| 5,556,242 | * 9/1996 | Sheldon et al. | 409/132 |
| 5,832,783 | * 11/1998 | Sheldon | 409/201 X |
| 5,906,461 | * 5/1999 | Lunz | 409/201 |
| 6,059,703 | * 5/2000 | Heisel | 483/31 |
| 6,155,758 | * 12/2000 | Wieland et al. | 409/201 |

FOREIGN PATENT DOCUMENTS

| | | |
|---|---|---|
| 196 40 769 A1 | 7/1997 | (DE) . |
| 196 36 099 A1 | 3/1998 | (DE) . |

OTHER PUBLICATIONS

5 D.O.F. robots; p. 19 of 37; "Spatial Robots"; internet site at http://www-sop.inria.fr/saga/personnel/merlet/Archi/node 2, Apr. 25, 2000.*

* cited by examiner

*Primary Examiner*—William Briggs
(74) *Attorney, Agent, or Firm*—Akin, Gump, Strauss, Hauer & Feld, L.L.P.

(57) ABSTRACT

A hexapodal machining center comprising a fixed frame (1) and a support (2) which are interconnected via six struts (3) of an adjustable length. The connecting points ($T_1$, $T_2$, $T_3$) of three struts on the support form a first working plane, whereas a further working plane is formed by the connecting points ($T_4$, $T_5$, $T_6$) of the three further struts on the support. The frame connection points ($G_1$, $G_2$, $G_3$, $G_4$, $G_5$, $G_6$) of the struts are also arranged in two separate working planes. The connecting points of the two working planes of the support are superimposed such that the connecting lines of the superimposed pairs of connecting points ($T_1$, $T_4$; $T_2$, $T_5$; $T_3$, $T_6$) extend in parallel with each other. This allows a high degree of movability of the support in all of the six degrees of freedom. In particular, the movability in the three rotational degrees of freedom and the force receiving capacity of the support are optimized.

17 Claims, 4 Drawing Sheets

HEXAPODAL MACHINING CENTER

CROSS-REFERENCE TO RELATED APPLICATION

This application is a continuation of International Application No. PCT/EP98/07593 filed Apr. 27, 1999 the disclosure of which is incorporated herein by reference.

BACKGROUND OF THE INVENTION

The present invention relates to a hexapodal machining center having a fixed frame and a support which are interconnected via six struts of an adjustable length.

Such hexapodal machining centers are used as machine tools. They are particularly suited for cutting machine tools, e.g., for milling, drilling, turning or grinding or for laser machining.

In principle, hexapodal machining centers consist of a support, which is sometimes designated as a working platform, and of a fixed frame which are interconnected by six struts of an adjustable length. This allows a movement of the working platform in all of the six spatial degrees of freedom, i.e., three translational degrees of freedom and three rotational degrees of freedom.

A first hexapodal machining center is known from U.S. Pat. No. 5,401,128. This known machine tool structure consists of an octahedral framework comprising twelve rigid struts. A machining unit comprising a spindle is arranged in the center of the framework. Furthermore, a fixed workpiece-receiving device is arranged in the lower part of the octahedral machine frame of the fixed workpiece-receiving device. The hexapod, i.e, a support or working platform for the machining unit, e.g., a drilling or milling spindle, is provided above the workpiece receiving device. Two respective struts of the hexapod which can be adjusted in their length are coupled with one end to a corner of a triangular upper frame part of the machine frame, the connecting points of the two struts on the machine frame being only slightly spaced apart with respect to their height. All of the connecting points of the six struts on the working platform are located in a joint plane. Such an arrangement limits the rotational movements. Moreover, the forces cannot be received in the struts in an optimum manner since these do not extend in the directions of the main load.

A further hexapodal machining center is known from U.S. Pat. No. 5,354,158. In the hexapod shown in that document, two neighboring struts are coupled at a corner of an imaginary triangle to the working platform and two other neighboring struts to the corner of a further imaginary triangle on the frame, the two triangles arranged in parallel with each other being rotated relative to each other. The connecting points of the struts on the working platform and on the frame are each arranged in a common plane. Moreover, it is known from U.S. Pat. No. 5,354,158 that the connecting points on the frame are arranged in two spaced-apart planes. Such an arrangement has similar shortcomings as the arrangement according to U.S. Pat. No. 5,401,128 with respect to the movability of the working platform and the force-receiving capacity.

SUMMARY OF THE INVENTION

It is therefore an object of the present invention to optimize the movability of the support in all of the six degrees of freedom, in particular in the three rotational degrees of freedom, as well as the force-receiving capacity in a hexapodal machining center of the above-mentioned type.

This object is achieved by a hexapodal machining center having a fixed frame and a support which are interconnected via six struts of an adjustable length, wherein the connecting points of three struts on the support form a first working plane, and the connecting points of the three further struts on the support form a second working plane spaced apart from the first working plane, wherein the connecting points of three struts on the frame form a first working plane and the connecting points of the three further struts on the frame form a second working plane spaced apart from the first working plane of the frame, and wherein the connecting points of the two working planes of the support are superimposed such that the connecting lines of the superimposed pairs of connecting points extend in parallel with each other.

A great freedom of movement of the support and the working platform, respectively, is thereby achieved because the joints of the struts at the connecting points on the support do not interfere with one another. In particular, a greater freedom of movement is thereby achieved with respect to the rotational degrees of freedom. Therefore, the hexapodal machining center can also be used for more compact supports or smaller machines.

Moreover, the superimposed configuration of the connecting points on the support improves the stiffness of the backing of the support, thereby ensuring a greater manufacturing accuracy.

A machining unit and/or sensor system for sensing the position may be mounted on the support. The machining unit may carry a spindle, with a desired spatial position of the spindle being provided depending on the respective requirements, e.g., horizontal or vertical. The structure of the frame is adapted accordingly.

The struts are suspended within the frame in such a manner that the connecting points of three respective struts on the frame form a total of two separate working planes. Such an arrangement of the struts will enhance movability, in particular with respect to the rotational degrees of freedom, and result in a more uniform force-receiving capacity. Moreover, a particularly economic arrangement of the constructional space is thereby made possible because the distribution of the connecting points on the support and on the frame will provide more space for the design of the respective joints at the connecting points. On the whole, the constructional freedom of design is increased and a more compact construction is made possible, so that the ratio of the space available for machining to the space required by the machining center is increased.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings.

DETAILED DESCRIPTION OF THE INVENTION

Figure 1:
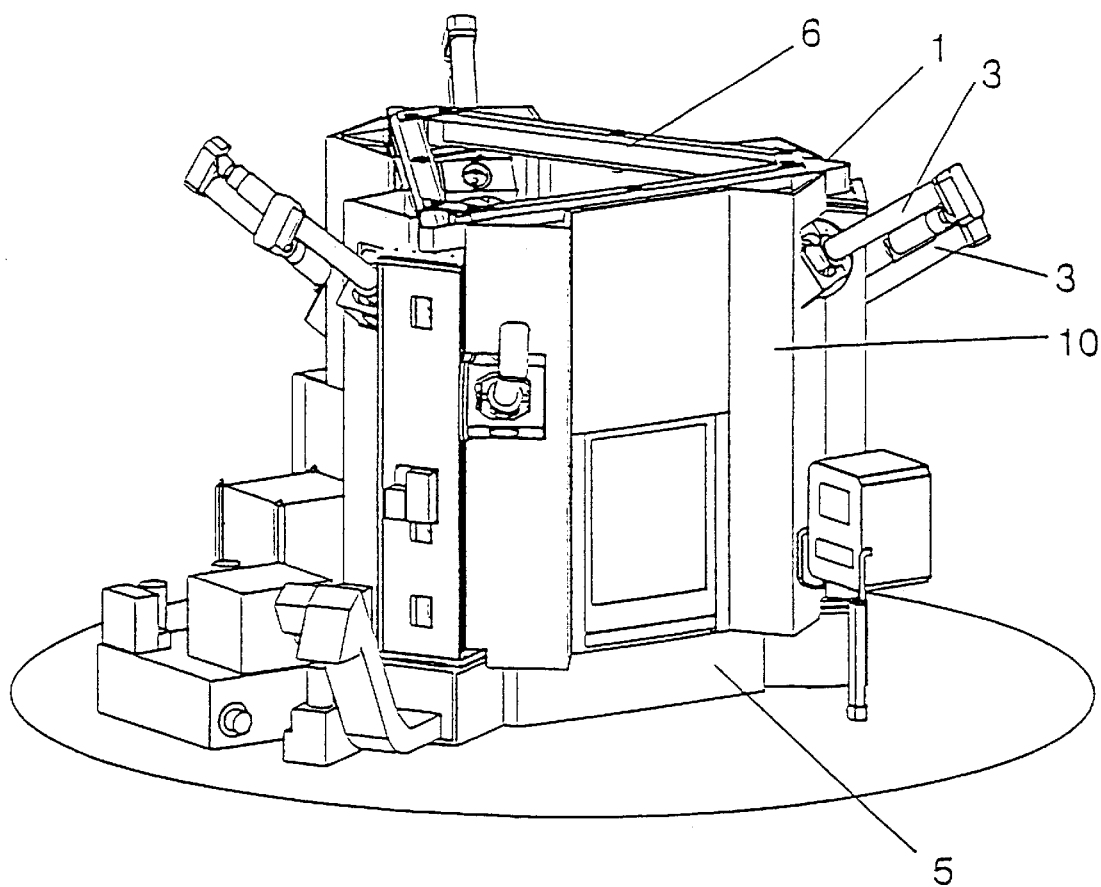
FIG. 1 is an overall perspective view of one embodiment of a hexapodal machining center according to the invention.

The hexapodal machining center illustrated in the figures of the embodiment is designed as a machine tool used for machining. The machine tool comprises a frame 1 which requires a substantially triangular base. At the corner points of the triangular base, three columns 4 extend upwards from a frame bed 5 at the floor side. The columns 4 are interconnected at their upper end via a joint frame yoke 6 and form a machine tool frame or frame 1 together with the frame bed 5.

A support or working platform 2 is suspended on said frame 1 via six struts 3 having an adjustable length. The supports 2 receive the tool proper, for instance a drilling or milling tool, to machine a workpiece in a machining room inside the frame 1, i.e., between the frame bed 5 and the support 2.

For the protection of the operating personnel, the frame openings which remain between the columns 4 are closed by way of panels 10 which have arranged therein viewing openings for controlling the manufacturing process. Moreover, there are closable access openings for providing access to the working area, in particular to a workpiece table 8 mounted on the frame bed 5. A machining area which is as large as possible is obtained in that the workpiece table 8 is movable in two directions in the plane of the frame bed 5, so that workpieces whose machining dimensions exceed the maximum motional range of the support 2 can also be machined on the whole.

Figure 2:
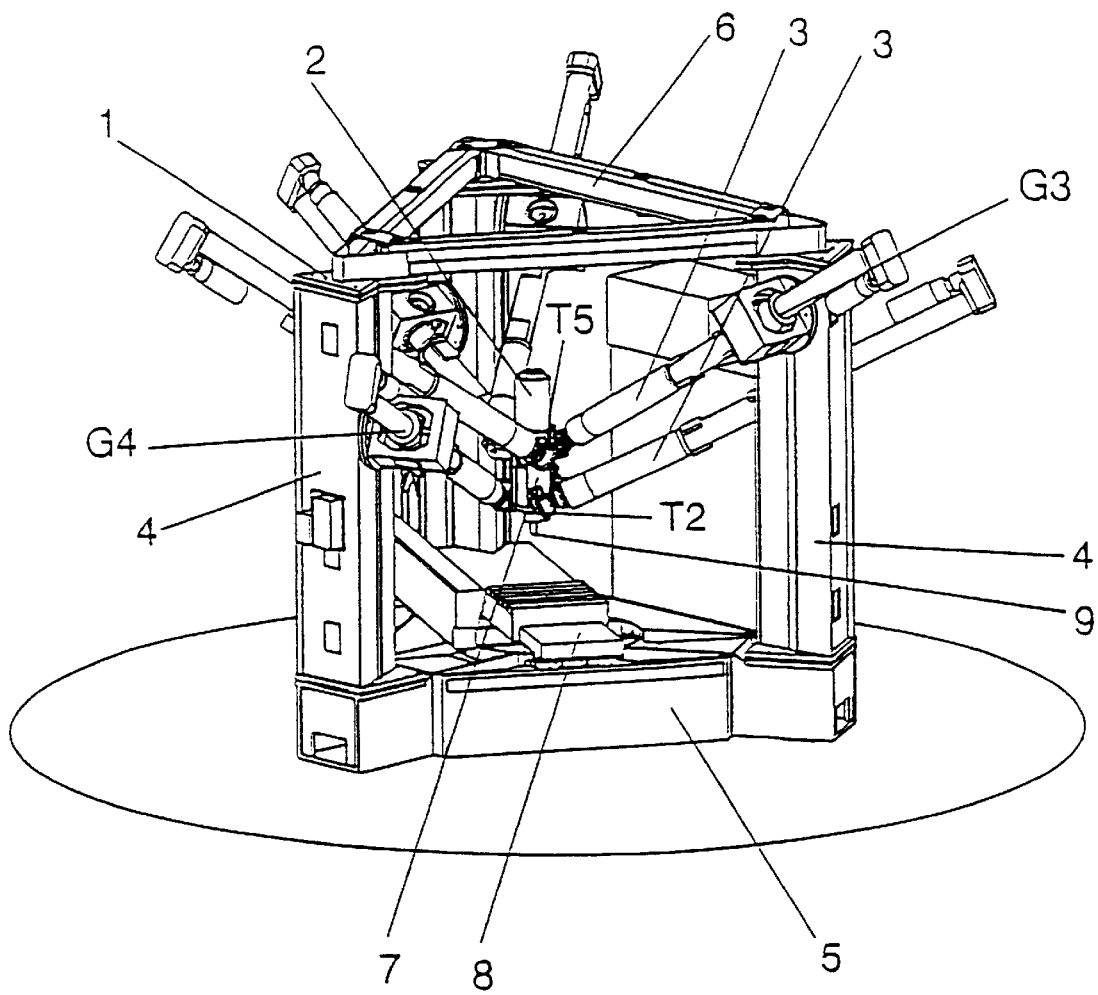
FIG. 2 is a perspective illustration of the hexapodal machining center according to FIG. 1 without any paneling.
Figure 3:
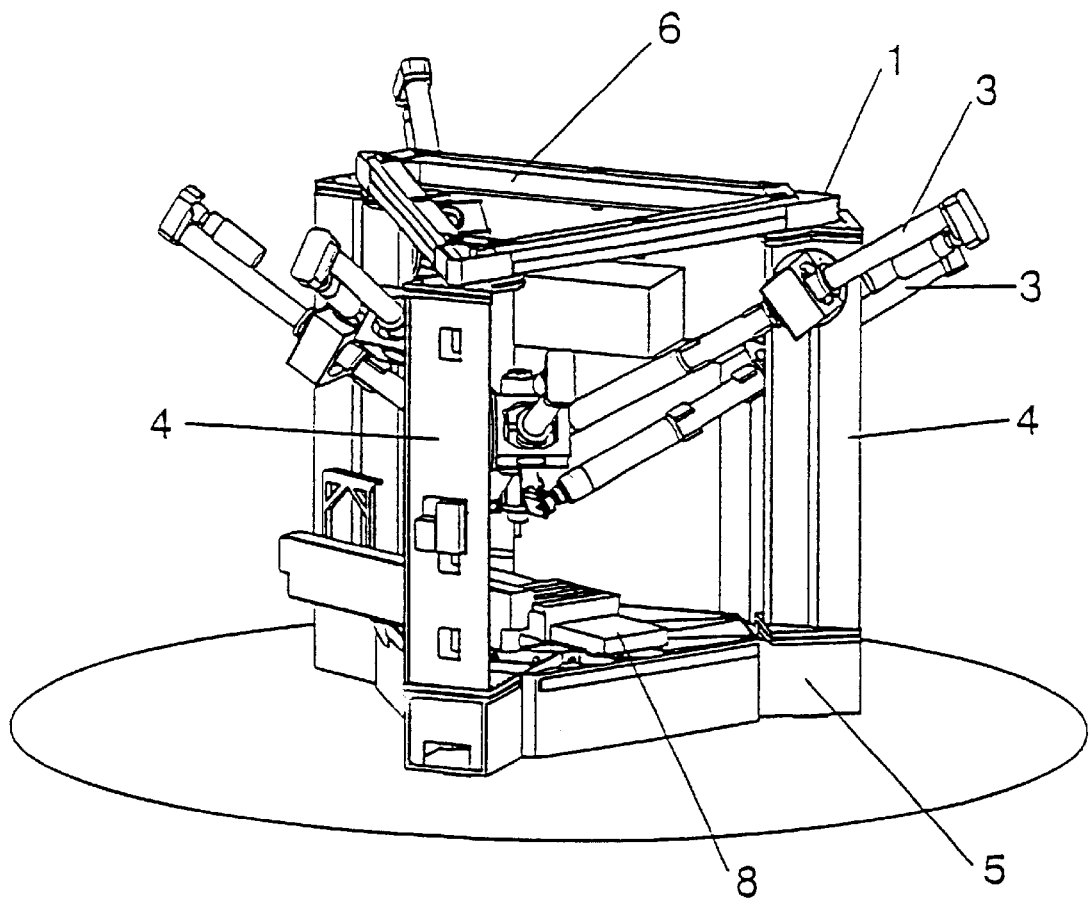
FIG. 3 is a further perspective illustration of the hexapodal machining center according to FIG. 1 without any paneling.

As becomes especially apparent from FIGS. 2 and 3, the support 2 has a basic shape which is substantially cylindrical relative to the longitudinal axis A thereof, with the longitudinal axis A in the inoperative state or the normal position of the support 2, extending in a direction perpendicular to the plane of the frame bed. In the illustrated embodiment as a cutting machine tool, the support 2 has provided thereon a main spindle 9, which is coaxial to the longitudinal axis A thereof and is driven by a drive device, for instance by an electric motor which is also arranged on the support 2.

On its outer surface, the cylindrical support 2 further comprises three connecting portions 7 that extend in the direction of the longitudinal axis A and are each flattened. Each of the connecting portions has provided thereon two joint attachments which are spaced apart in the direction of the longitudinal axis A and via which the struts 3 are coupled to the support 2. The three connecting portions 7 are uniformly distributed on the circumference of the cylindrical support 2. The joint attachments on the individual connecting portions are always at the same height. On the whole, there are two groups of connecting points for the struts 3, with the connecting points forming a respective equilateral triangle. The upper connecting points $T_1$, $T_2$, $T_3$ in FIGS. 2 and 3 define a first working plane of the struts 3 on the support 2, and the lower connecting points $T_4$, $T_5$, $T_6$ in these figures define a second parallel working plane that is spaced apart from the first working plane. The working planes extend in a direction perpendicular to the longitudinal axis A of the support 2 and thus also to the rotational axis of the main spindle 9.

Figure 4:
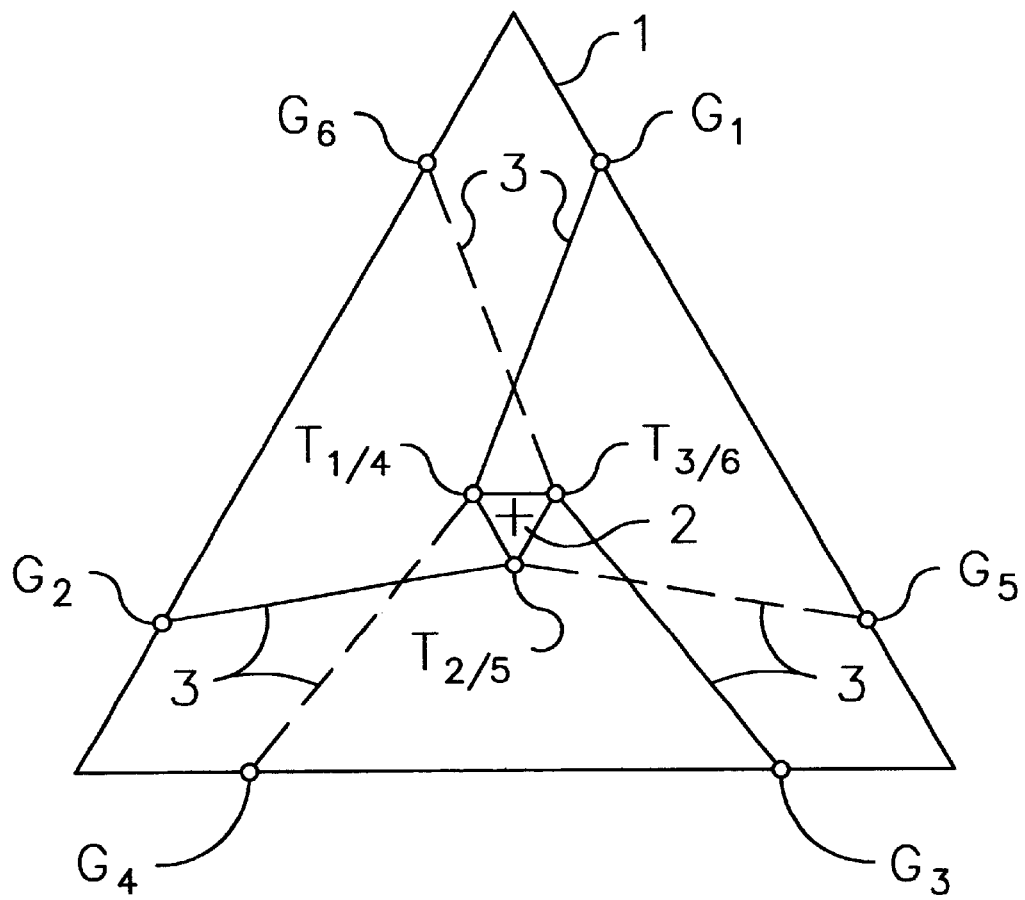
FIG. 4 is a schematic top diagram of the hexapodal machining center according to FIG. 1 for illustrating the geometry of the struts.

The congruence, i.e., the superimposed configuration of the connecting points $T_1$ to $T_6$ of the support can in particular be seen in FIG. 4. For instance, the "upper" connecting point T1 of the support is positioned above the "lower" connecting point T4 of the support. As can further be seen in FIG. 4, all of the connecting lines of such superimposed pairs of connecting points of the support extend in parallel with one another. This is also the case whenever, although the connecting points of the support are superimposed on the respective connecting portions, the points are spaced apart from one another at different distances, so that in such a case the first and second working planes of the support may also be bent with respect to each other.

The respectively upper struts 3, i.e., those that are coupled to the support 2 at the support connection points $T_1$, $T_2$, $T_3$ of the first working plane, extend towards a respective column 4 of the frame. The connecting points $G_1$, $G_2$, $G_3$ on the frame 1 define a first connecting plane of the frame at the yoke end of the columns 4. The three remaining struts are coupled to the columns 4 below the first working plane in a second working plane of the frame in FIGS. 2 and 3.

The struts 3 are here arranged such that two struts extending away from a connecting portion 7 of the support 2 extend towards different columns 4. As can be seen from FIG. 4, the arrangement is further chosen such that the struts coupled to the connecting points $T_1$, $T_2$, $T_3$ of the first working plane of the support are operative in a rotational direction based on the longitudinal axis A of the support 2, i.e., counterclockwise in FIG. 4, whereas the remaining struts at the second working plane of the support are operative in the opposite rotational direction, i.e., clockwise in FIG. 4.

The support connection points $T_1$, $T_2$, $T_3$ of the first working plane of the support are connected to the connecting points $G_1$, $G_2$, $G_3$ of the first working plane of the frame. Likewise, the connecting points of the two second working planes are coupled with each other.

As can further be learnt from FIG. 4, a column 4 has provided thereon a respective strut 3 which connects the connecting points of the first working plane, e.g., $T_1$ and $G_1$, and a strut 3 which connects the connecting points, e.g., $T_6$ and $G_6$ of the second working plane. The coupling operation is here performed at opposite sides of the respective column, with the type of arrangement being identical for each of the three columns 4. The struts 3 which extend from a column 4 to the support 2 are operative on said support in tangential direction on neighboring connecting portions 7, so that said struts when viewed from the top, as shown in FIG. 4, spatially cross each other. Such a crossing, however, does not impair the motional freedom of the support, 2, because these two struts are coupled in two different working planes to the support. The distance of the working planes on the support is here chosen to be greater than the diameter of the individual struts 3.

The struts may be designed as hydraulic or pneumatic cylinders or also, as shown in the embodiment, as motor-driven screw drives. The struts are coupled to the support 2 and also to the frame 3 by way of universal joints, such as ball or cardan joints, which allow a rotational movement about all of the three spatial axes at the same time.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

I claim:

1. A hexapodal machining center comprising a fixed frame (1) and a support (2) which are interconnected via six struts (3) of an adjustable length, wherein the connecting points ($T_1$, $T_2$, $T_3$) of three struts (3) on the support (2) form a first working plane and the connecting points ($T_4$, $T_5$, $T_6$) of the three further struts (3) on the support (2) form a second working plane spaced apart from the first working plane of the support, wherein the connecting points ($G_1$, $G_2$, $G_3$) of three struts (3) on the frame (1) form a first frame working plane and the connecting points ($G_4$, $G_5$, $G_6$) of the three further struts (3) on the frame (1) form a second working plane spaced apart from the first frame working plane, and wherein the connecting points ($T_1$, $T_2$, $T_3$, $T_4$, $T_5$, $T_6$) of the first and second working planes of the support are superimposed such that the connecting lines of the superimposed pairs of connecting points ($T_1$, $T_4$; $T_2$, $T_5$; $T_3$, $T_6$) extend in parallel with each other.

2. The hexapodal machining center according to claim 1, wherein the frame (1) has a triangular base.

3. The hexapodal machining center according to claim 1, wherein the frame (1) comprises three columns (4) that are connected to one another at one end thereof via a frame bed (5) and at the other end thereof via a frame yoke (6).

4. The hexapodal machining center according to claim 3, wherein all of the struts (3) are coupled to the columns (4).

5. The hexapodal machining center according to claim 4, wherein two respective struts (3) are coupled to a joint column (4), the connecting points ($G_2$, $G_4$; $G_3$, $G_5$; $G_1$, $G_6$) being spaced apart from each other in the direction of a longitudinal axis of the column (4).

6. The hexapodal machining center according to claim 5, wherein struts coupled to a joint column (4) are coupled at opposite sides of the column.

7. The hexapodal machining center according to claim 5, wherein the two struts (3) that are respectively coupled to a column (4) cross each other.

8. The hexapodal machining center according to any of claim 1, wherein all of the struts (3) tangentially act on the support (2), with all of the struts that are coupled to connecting points ($T_1$, $T_2$, $T_3$) of the first working plane of the support being operative in a rotational direction based on a longitudinal axis (A) of the support (2) whereas the struts which are coupled to connecting points ($T_4$, $T_5$, $T_6$) of the second working plane of the support are operative in the opposite rotational direction.

9. The hexapodal machining center according to claim 1, wherein the support (2) has a basic shape substantially cylindrical to the longitudinal axis (A) thereof, the outer surface thereof having located thereon three connecting portions (7) extending in a direction of the longitudinal axis and having two longitudinally spaced-apart joint attachments of the connecting points ($T_1$, $T_4$; $T_2$, $T_5$; $T_3$, $T_6$) for coupling two respective struts (3).

10. The hexapodal machining center according to claim 9, wherein the struts (3) starting from a connecting portion (7) extend toward different columns (4).

11. The hexapodal machining center according to claim 1, wherein the three connecting points ($T_1$, $T_2$, $T_3$, $T_4$, $T_5$, $T_6$, $G_1$, $G_2$, $G_3$, $G_4$, $G_5$, $G_6$) forming a respective working plane form an equilateral triangle.

12. The hexapodal machining center according to claim 11, wherein the triangles formed by the connecting points of the support are congruent with respect to each other when viewed in the direction of a longitudinal axis (A) of the support (2).

13. The hexapodal machining center according to claim 11, wherein, based on the longitudinal axis (A) of the support (2), the triangles formed by the connecting points of the frame are arranged such that they are displaced relative to each other by an angle.

14. The hexapodal machining center according to claim 1, wherein the struts (3) are coupled via universal joints which allow movements in all of the three spatial axes, also in superimposed fashion.

15. The hexapodal machining center according to claim 1, wherein a tool table (8) which is arranged to be movable in two different axial directions is supported on a frame bed (5) between said bed (5) and the support (2).

16. The hexapodal machining center according to claim 15, wherein the support (2) comprises a main spindle (9) which extends along a longitudinal axis (A) of the support (2).

17. The hexapodal machining center according to claim 16, wherein in an inoperative position of the support (2) the axis of the main spindle (9) extends in a direction perpendicular to the motional axes of the tool table (8).

\* \* \* \* \*